US007684776B2

(12) United States Patent
Nation

(10) Patent No.: US 7,684,776 B2
(45) Date of Patent: Mar. 23, 2010

(54) WIRELESS COMMUNICATION DEVICE HAVING VARIABLE GAIN DEVICE AND METHOD THEREFOR

(75) Inventor: Med A. Nation, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 10/328,956

(22) Filed: Dec. 24, 2002

(65) Prior Publication Data

US 2004/0121750 A1 Jun. 24, 2004

(51) Int. Cl.
*H04B 1/06* (2006.01)
*H04B 7/00* (2006.01)

(52) U.S. Cl. ..................... 455/276.1; 455/273; 455/275

(58) Field of Classification Search ................ 455/561, 455/500, 501, 504, 506, 562.1, 101, 103, 455/127.1, 127.2, 127.3, 272, 273, 275, 276.1
See application file for complete search history.

(56) References Cited

U.S. PATENT DOCUMENTS

| | | | | |
|---|---|---|---|---|
| 3,323,080 | A | 5/1967 | Schwelb et al. | |
| 3,440,570 | A | 4/1969 | Kasper | |
| 3,909,827 | A * | 9/1975 | Tricoles et al. | 342/179 |
| 4,161,705 | A | 7/1979 | Nemit et al. | |
| 4,161,733 | A * | 7/1979 | Piesinger | 342/370 |
| 4,330,764 | A | 5/1982 | Miedema | |
| 4,566,013 | A * | 1/1986 | Steinberg et al. | 342/372 |
| 4,628,517 | A * | 12/1986 | Schwarz et al. | 375/267 |
| 4,647,789 | A | 3/1987 | Upadhyayula | |
| 4,788,509 | A | 11/1988 | Bahl et al. | |
| 4,961,062 | A | 10/1990 | Wendler | |
| 5,019,793 | A | 5/1991 | McNab | |
| 5,062,148 | A * | 10/1991 | Edwards | 455/506 |
| 5,168,250 | A | 12/1992 | Bingham | |
| 5,222,246 | A * | 6/1993 | Wolkstein | 455/13.4 |
| 5,309,124 | A | 5/1994 | Cazaux et al. | |
| 5,789,996 | A * | 8/1998 | Borodulin | 333/117 |
| 5,939,917 | A | 8/1999 | Debaty | |
| 6,087,986 | A * | 7/2000 | Shoki et al. | 342/383 |
| 6,184,841 | B1 * | 2/2001 | Shober et al. | 343/853 |
| 6,218,985 | B1 * | 4/2001 | Adams | 342/372 |

(Continued)

FOREIGN PATENT DOCUMENTS

CN 1726617 A 1/2006

(Continued)

OTHER PUBLICATIONS

Office Action mailed Jul. 25, 2008 for Chinese Application No. 200380106556.9, 16 pgs., (Jul. 25, 2008), 4 pgs.

(Continued)

*Primary Examiner*—Edward Urban
*Assistant Examiner*—Christian A Hannon
(74) *Attorney, Agent, or Firm*—Cool Patent, P.C.; Joseph P. Curtin

(57) ABSTRACT

Briefly, in accordance with one embodiment of the invention, a wireless device has an array of antennas. A signal is provided to one of the antenna by two variable gain amplifiers, one of which processes a signal that is shifted in phase compared to the signal processed by the other variable gain amplifier.

24 Claims, 3 Drawing Sheets

U.S. PATENT DOCUMENTS

| | | | | |
|---|---|---|---|---|
| 6,275,120 | B1 | 8/2001 | Vaninetti et al. | |
| 6,320,480 | B1 | 11/2001 | Kintis et al. | |
| 6,336,033 | B1 * | 1/2002 | Yamaguchi et al. | 455/273 |
| 6,377,213 | B1 * | 4/2002 | Odachi et al. | 342/383 |
| 6,430,215 | B1 * | 8/2002 | Kinoshita et al. | 375/147 |
| 6,448,938 | B1 * | 9/2002 | Chiang et al. | 343/850 |
| 6,463,303 | B1 | 10/2002 | Zhao | |
| 6,473,055 | B2 | 10/2002 | Kohno et al. | |
| 6,788,268 | B2 * | 9/2004 | Chiang et al. | 343/850 |
| 6,889,061 | B2 * | 5/2005 | Shapira et al. | 455/562.1 |
| 2002/0126745 | A1 * | 9/2002 | Prysby et al. | 375/148 |
| 2002/0171583 | A1 * | 11/2002 | Purdy et al. | 342/368 |
| 2003/0120809 | A1 * | 6/2003 | Bellur et al. | 709/239 |
| 2003/0162566 | A1 | 8/2003 | Shapira et al. | |
| 2004/0121750 | A1 | 6/2004 | Nation | |

FOREIGN PATENT DOCUMENTS

| | | | |
|---|---|---|---|
| EP | 1091447 | A1 | 4/2001 |
| JP | 08-097602 | | 4/1996 |
| JP | 2000138520 | | 5/2000 |
| JP | 2001298389 | A | 10/2001 |
| JP | 2006-512849 | | 4/2006 |
| KR | 10-2005-0084476 | A | 8/2005 |
| TW | 1240929 | | 10/2005 |
| WO | 2001/091282 | A2 | 11/2001 |
| WO | 02/11301 | A2 | 2/2002 |
| WO | 0211301 | A2 | 2/2002 |
| WO | WO 02/11301 | A2 | 2/2002 |
| WO | WO 03/090378 | A1 | 10/2003 |
| WO | 2004/062031 | A1 | 7/2004 |

OTHER PUBLICATIONS

Office Action mailed Jul. 25, 2008 for Chinese Application No. 200380106556.9, 15 pgs.

Agrawal, A. K., et al., "Beamformer architectures for active phased-array radar antennas", IEEE Transactions on Antennas and Propagation, vol. 47, No. 3, Mar. 31, 1999, pp. 432-442.

Office Action received for KR Patent Application No. 10-2005-7011810, mailed on Jan. 29, 2008, 3 pages of English Translation.

Office Action received for KR Patent Application No. 10-2005-7011810, mailed on Jul. 31, 2007, 2 pages of English Translation.

Office Action received for KR Patent Application No. 10-2005-7011810, mailed on Jul. 31, 2008, 2 pages of English Translation.

Office Action received for KR Patent Application No. 10-2005-7011810, mailed on Feb. 27, 2009, 4 pages of English Translation.

Office Action received for JP Patent Application No. P2004-564980, mailed on Mar. 4, 2008, 2 pages of English Translation and 2 pages of Office Action.

Office Action received for JP Patent Application No. P2004-564980, mailed on Aug. 18, 2008, 3 pages of English Translation and 3 pages of Office Action.

Office Action received for JP patent Application No. P2004-564980, mailed on Jan. 26, 2009, 3 pages of English Translation and 3 pages of Office Action.

Office Action received for CN Patent Application No. 200380106556.9, mailed on Jun. 5, 2009, 10 pages of English Translation and 8 pages of Office Action.

Office Action received for KR Patent Application No. 10-2009-7009323, mailed on Jul. 2, 2009, 2 pages of English Translation.

International Search Report received for PCT Patent Application No. PCT/US2003/36308, mailed on Apr. 28, 2004, 6 pages Office Action received for TW Patent Application No. 92132047, mailed on Apr. 14, 2006, 4 pages of English Translation and 6 pages of Office Action.

Office Action received for TW Patent Application No. 92132047, mailed on Dec. 20, 2004, 3 pages of English of Translation and 2 pages of Office Action.

Office Action received for TW Patent Application No. 92132047, mailed on Oct. 26, 2007, 5 pages of English Translation and 7 pages of Office Action.

Office Action received for TW Patent Application No. 92132047, mailed on May 25,2005, 3 pages of English Translation and 5 pages of Office Action.

* cited by examiner

WIRELESS COMMUNICATION DEVICE HAVING VARIABLE GAIN DEVICE AND METHOD THEREFOR

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
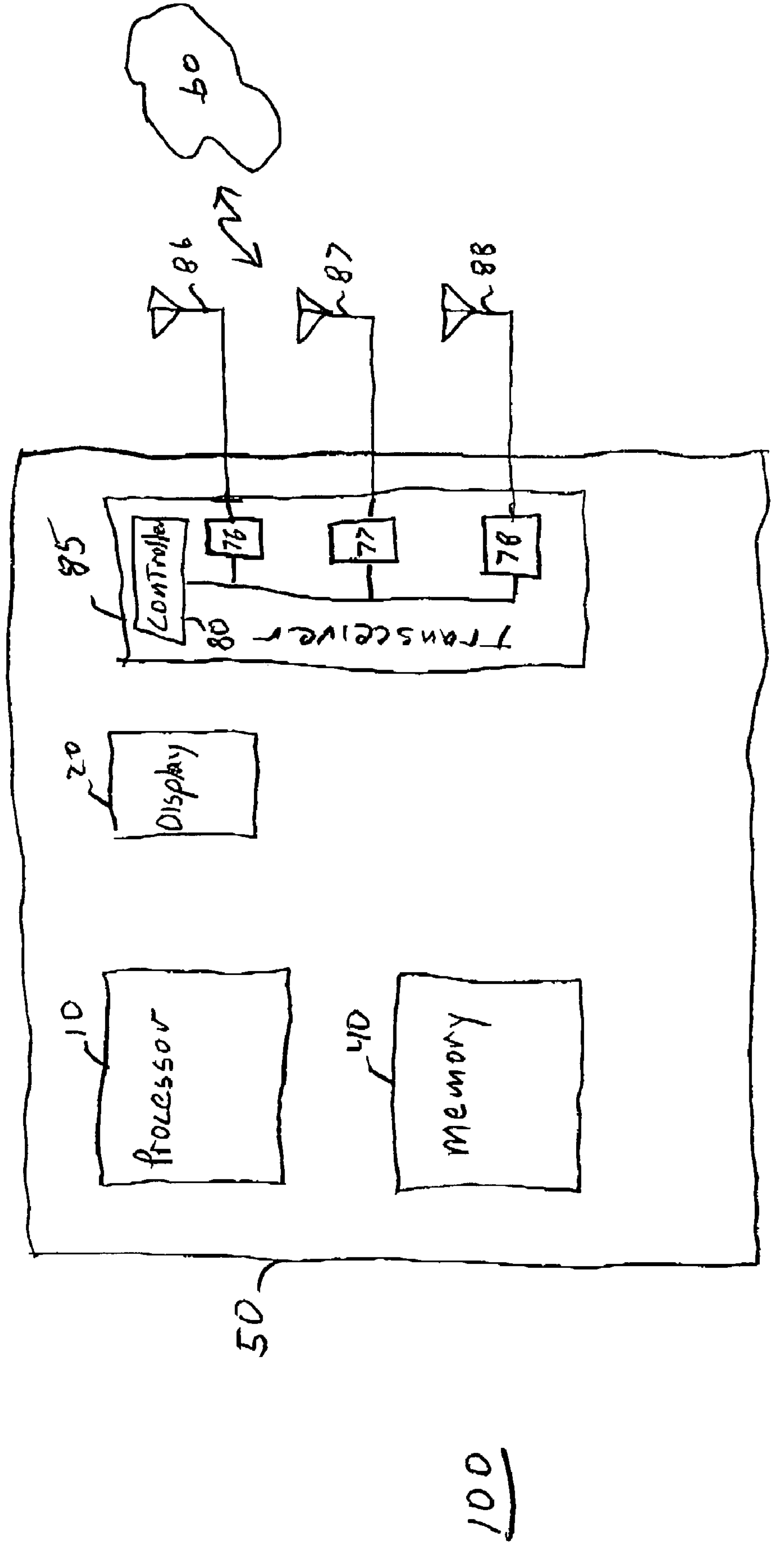
FIG. 1 is a schematic representation of a wireless device in accordance with an embodiment.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be understood that embodiments of the present invention may be used in a variety of applications. Although the present invention is not limited in this respect, the devices disclosed herein may be used in many apparatuses such as in the transceivers, transmitters, and/or receivers of a radio system. Turning to FIG. 1, an embodiment 100 in accordance with the present invention is described. Embodiment 100 may comprise a portable computing or communication device 50 such as a mobile communication device (e.g., cell phone), a two-way radio communication system, a one-way pager, a two-way pager, a personal communication system (PCS), a personal digital assistant (PDA), a portable computer, or the like. Alternative embodiments may include base stations, access points, or other wireless communication equipment in any network.

Other embodiments may include, for example, any combination of laptop and portable commuters with wireless communication capability, web tablets, wireless headsets, instant messaging devices, MP3 players, digital cameras, and other devices that may receive and/or transmit information wirelessly. Although it should be understood that the scope and application of the present invention is in no way limited to these examples. Other embodiments of the present invention may include other computing systems that may or may not be portable or even involve communication systems such as, for example, desktop or portable computers, servers, network switching equipment, etc.

In this particular embodiment, wireless communication device 50 may include a processor 10 that may execute instructions such as instructions stored in a memory 40. Processor 10 may be one of a variety of integrated circuits such as, for example, a microprocessor, a central processing unit (CPU), a digital signal processor, a microcontroller, a reduced instruction set computer (RISC), a complex instruction set computer (CISC), or the like, although the scope of the present invention is not limited by the particular design or functionality performed by processor 10. In addition, in some alternative embodiments, wireless communication device 50 may comprise multiple processors that may be of the same or different type.

Wireless communication device 50 may also comprise memory 40 that may comprise any variety of volatile or non-volatile memory such as any of the types of storage media recited earlier, although this list is certainly not meant to be exhaustive and the scope of the present invention is not limited in this respect. Memory 40 may comprise persistent memory to be used to store sets of instructions such as instructions associated with an application program, an operating system program, a communication protocol program, etc. For example, the instructions stored in memory 40 may be used to perform wireless communications, provide security functionality for wireless communication device 50, user functionality such as calendaring, email, internet browsing, etc.

Wireless communication device 50 may also comprise a display 20 to provide information to a user. Alternatively or in addition, wireless communication device 50 may include other components such as input/output devices, audio outputs, etc. However it should be understood that the scope of the present invention is not limited so as to require any particular combination of components shown in FIG. 1.

Wireless communication device 50 may also include a transceiver 85 to provide access to other devices, service, networks, etc that may be used to allow wireless communication device 50 to communicate with other networks through a wireless link. As shown, transceiver 85 may use an array of antennas made of up antennas 86-88 to wirelessly communicate with network 60. It should be understood that the scope of the present invention is not limited to embodiments where communication is made to a single network, as alternative embodiments may provide communication to two or more networks. Furthermore, the scope of the present invention is not limited to embodiments having three antennas. Alternative embodiments may include devices that have one, two, or four or more antenna.

In this particular embodiment, transceiver 85 may include variable gain modulators 76-78 that may be coupled to antennas 86-88, respectively. As explained in more detail below, a controller 80 may be used to coordinate the transmission of signals via variable gain modulators 76-78 so as to increase the relative strength of a transmitted signal (i.e. improved signal to noise ratio) in a particular or general direction, while reducing the effect of the signal in another particular or general direction, although the scope of the present invention is not limited in this respect. It should be understood that the scope of the present invention is not limited to applications involving the transmission of signals over an antenna array as the scope of the present invention includes alternative embodiments where variable gain modulators are used to receive signals as well. In yet other embodiments, variable gain modulators may be used to both transmit and receive signals.

Although the scope of the present invention is not limited in this respect, communication transceiver 85 may employ a variety of wireless communication protocols such as cellular (e.g. Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like). In addition, wireless communication device 50 may also include multiple transceivers that use different communication protocols.

In addition, transceiver 85 may use other protocols such as wireless local area network (WLAN), wide area network (WAN), or local area network (LAN) protocols such as the Industrial Electrical and Electronics Engineers (IEEE) 802.11 standard, Bluetooth™, infrared, etc. (Bluetooth is a registered trademark of the Bluetooth Special Interest Group).

It should be understood that the scope of the present invention is not limited by the types of, the number of, or the frequency of the communication protocols that may be used by wireless communication device 50. Furthermore, alternative embodiments may have more than two communication modules (either wired or wireless) and communication modules need not have separate antennae, and some or all may share a common antenna. It should also be understood that wireless communication device 50 may include other optional components such as, for example, a vocoder to encode voice data, etc.

Figure 2:
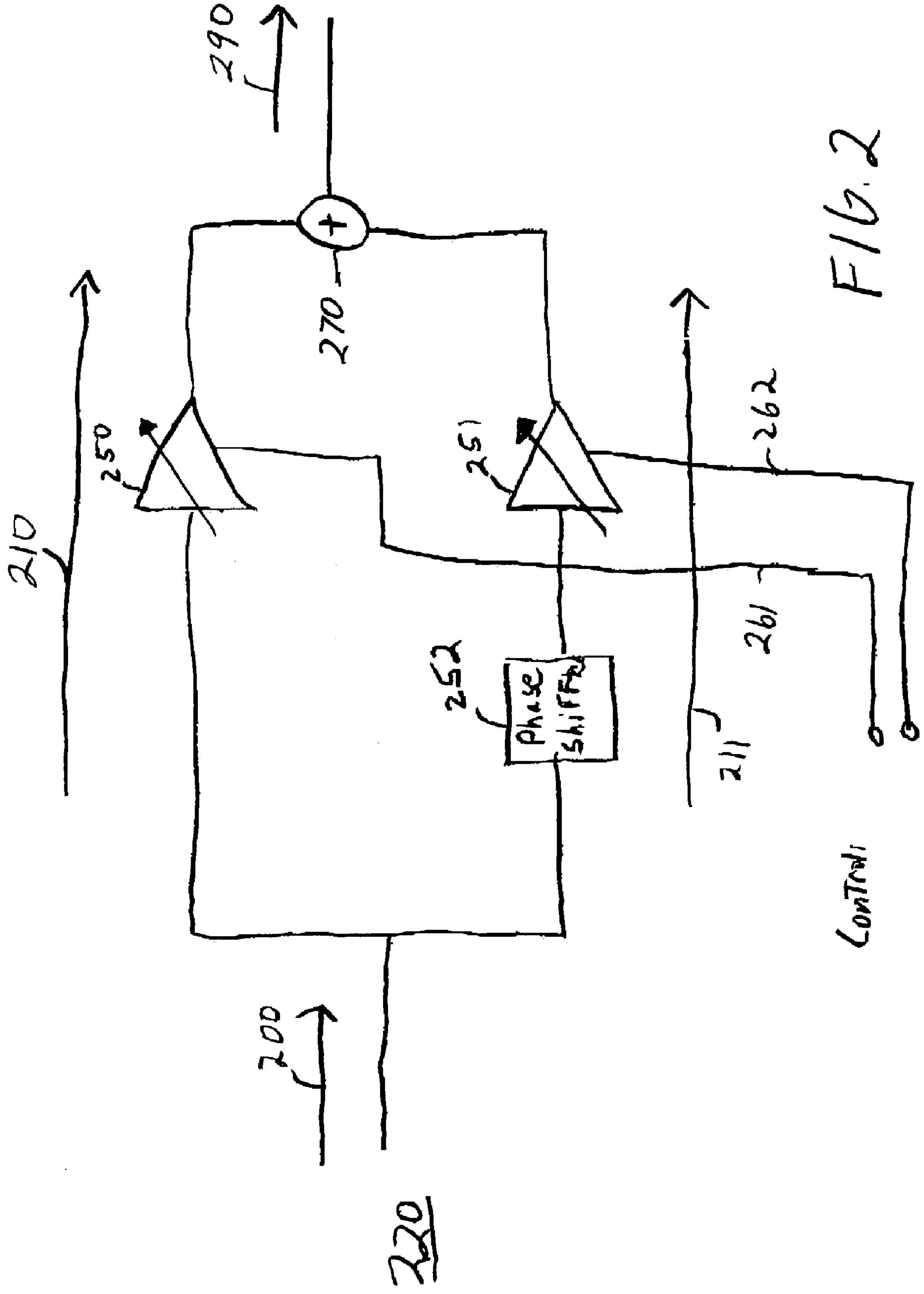
FIG. 2 is a schematic representation of a portion of a wireless device in accordance with an alternative embodiment.

Referring now to FIG. 2, a particular embodiment for a variable gain modulator 220 is provided. Variable gain modulator 220 may be an example of how modulators 76-77 (see FIG. 1) may be implements, although it should be understood that every one of variable gain modulators has to be arranged in the same manner. It should also be understood that variable gain modulator 200 and/or transceiver 85 (see FIG. 1) may include other components such as low-noise amplifiers (LNA's), filters, oscillators, etc. which are not shown so as not to obscure the present embodiment.

Variable gain modulator 76 may comprise two signal processing paths (indicated with arrows 210-211) that may be used to process an input signal 200 and provide an output signal 290, although it should be understood that alternative embodiments may include more than two signal processing paths. Although the scope of the present invention is not limited in this respect, signal processing paths 210 and 211 may include a variable gain device 250-251, such as a variable gain amplifier. Signal processing path 211 may further include a phase shift element 252.

As shown in FIG. 2, input signal 200 may be provided to both variable gain device 250 and phase shift element 252. Phase shift element may adjust the phase of input signal 200 by an amount ranging from about 1 degree to 180 degrees to provide the input signal. In this particular embodiment, phase shift element may shift input signal 200 by about 90 degrees. The shift in phase may be accomplished using a variety of techniques. For example, phase shift element 252 may comprise a hybrid phase splitter or an LC phase shift network. Alternatively, phase shift element may comprise a transmission line of varying lengths. For example, phase shifting element 252 may comprise a transmission line that is approximately one-fourth the length of input signal 200 to adjust the phase of input signal 200 by approximately 90 degrees. It should be understood that other lengths, and corresponding shifting of input signal 200 are possible.

In this particular embodiment, the output of phase shifting element 252 may be provided to variable gain amplifier. Thus, the input of variable gain device 251 is sifted with respect to the input of variable gain device 250. In alternative embodiments, phase shifting element may be positioned after variable gain device 251. Therefore, phase shifting element 252 may receive the output of variable gain device 251 and performs phase shifting after input signal 200 has be processed by variable gain device 251. In such an alternative arrangement, the phase shifting element may provide the output signal of signal processing path 211, although the scope of the present invention is not limited in this respect.

Although the scope of the present invention is not limited in this respect, in this particular embodiment, the output of variable gain devices 250-251 may be summed together by an adder 270 that may represent adding the resulting signals from signal processing paths 210 and 211. Thus, the output of adder 279 (i.e. output signal 290) may represent the addition of two components: one component representing an amplified version of input signal 200, the other representing an amplifier and phase shifted version of input signal 200. Thus, as explained below, the output 290 of variable gain modulator 220 may be provided by altered by adjusting the gain of variable gain devices 250-251.

The amount or degree of gain applied by variable gain devices 250-251 may be controlled by signal lines 260 and 261, respectively. Although the scope of the present invention is not limited in this respect, signal lines 260-261 may be provided and adjusted by a control unit such as, for example, controller 80 (see FIG. 1). However, it should be understood that the scope of the present invention is not limited by how the gain of variable gain devices 250-251 is adjusted or where the signals to make the adjustments originate. Furthermore, the scope of the present invention is not limited by the frequency at which adjustments in the gain are made as they could be made periodically, dynamically, or upon the occurrence of some other triggering mechanism occurring within wireless communication device 50.

For example, a processor or state machine may be employed to monitor the signals being received/transmitted by antennas 86-88 (see FIG. 1) and determine what adjustments should be made to the gain of variable gain devices 250-251. Alternatively, adjustments may be made in accordance with a beam forming computation so that wireless communication device 50 may transmit a signal with the desired characteristics, is adapted to receive a signal with antennas 86-88, or both. Wireless communication device 50 may also optionally employ a feedback mechanism so that appropriate adjustments may be determined and made depending on the signals being transmitted and/or received in a real-time manner, although the scope of the present invention is not limited in this respect. IN alternative embodiments adjustments may be made with some delay to allow time for the signals to traverse wireless communication device 50 and/or to determine what changes, if any, should be made.

In another embodiment of the present invention, variable gain modulators 76-78 (see FIG. 1) may be operated or adjusted independently so as to alter the signals being transmitted by antennas 86-88. Thus, a controller (e.g. controller 80 may be coupled to variable gain modulators via a bus and may be adapted to provide control signals to variable gain modulators to adjust their operation independently of the others. In such embodiments, the signals may be digital or analog, and thus, transceiver 85 may include the appropriate analog-to-digital (AD) or digital-to-analog (DA) converters. In yet another embodiment, transceiver 85 may include two or more variable gain modulators couple to each antennae where one variable gain modulator may be used to process signals received by the antenna and another variable gain modulator may process the signal to be transmitted by the same antenna.

Figure 3:
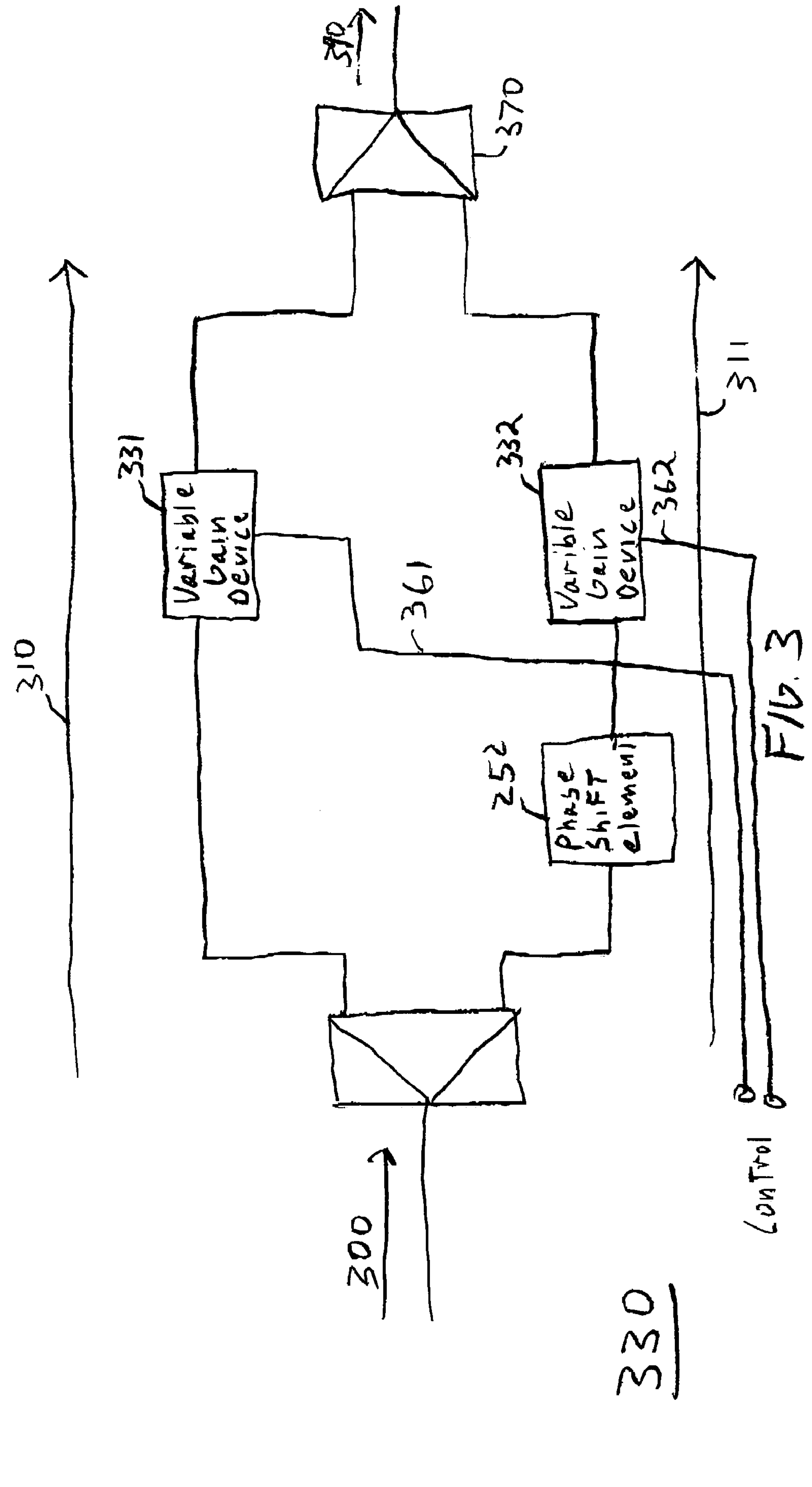
FIG. 3 is a schematic representation of a portion of a wireless device in accordance with an alternative embodiment.

Turning to FIG. 3, an alternative embodiment for a variable gain modulator is provided. Variable gain modulator 330 may include a power splitter to provide input signal 300 to a signal processing paths 310 and 311. Although the scope of the present invention is not limited in this respect, signal processing path 310 may include a variable gain device 331. Signal processing path 311 may include phase shifting element 252 such as one of those described above and a variable gain device 332. Variable gain devices 331-332 may include a variable gain amplifier, an attenuator, a bi-directional attenuator, or the like. Furthermore, variable gain device 331 may be a device that is different than variable gain device 332.

If variable gain devices 331-332 are a type of attenuator, this particular embodiment may provide a benefit in that the signal processing paths 310 and/or 311 may be bi-directional so that variable gain modulator may be used to transmit and receive signals from an antenna, although the scope of the present invention is not limited in this respect. Variable gain modulator 330 may also include a power splitter 370 that may be used to sum or add the output of variable gain devices 331-332 to provide an output signal 390. It should be understood that in alternative embodiments, phase shifting element 252 may be positioned so as to receive the output of variable gain device 332 and provide the output of signal processing path 311. In yet other embodiments, some or all the components shown in FIGS. 2-3 may be interchanged, as desired, to provide a variable gain modulator having different characteristics.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless communication device, comprising:

an antenna array comprising a first antenna and a second antenna;

a first gain modulator coupled to the first antenna and a second gain modulator coupled to the second antenna, the first and second gain modulators each comprising:

a first signal path comprising a phase shift element to bidirectionally shift a phase of a signal passing through the first signal path a predetermined fixed amount, and a first variable gain device to bidirectionally vary an amplitude of the signal passing through the first signal path; and a second signal path comprising a second variable gain device to bidirectionally vary an amplitude of a signal passing through the second signal path, each of the amplitude of the signal passing through the first signal path and the amplitude of the signal passing through the second signal path being capable of being independently and simultaneously controlled with respect to the amplitude of the signal of the other signal path, the first signal path of the first gain modulator being summed with the second signal path of the second gain modulator to form a summed signal comprising an amplitude that is based on the sum of the amplitudes of the signals in the first and second signal paths and comprising a phase that is based on the predetermined fixed phase shift, and the summed signal being coupled to a respective one of the first antenna or the second antenna; and a processor capable of adjusting the amplitude of the signal passing through at least one of the first signal path and the second signal path of at least one of the first gain modulator and the second gain modulator or combinations thereof, in accordance with a beam forming computation to transmit a signal of a desired characteristic, or receive a signal, or combinations thereof by the first antenna and the second antenna.

2. The wireless communication device of claim 1, wherein the first variable gain device comprises a bidirectional variable gain amplifier.

3. The wireless communication device of claim 1, wherein the wireless communication device is a device selected from the group comprising: a base station, a portable communication device, an access point, or combinations thereof.

4. The wireless communication device of claim 1, wherein the predetermined fixed amount of bidirectional phase shift of the phase shift element being selected from about 1 degree to about 180 degrees.

5. The wireless communication device of claim 4, wherein predetermined fixed amount of bidirectional phase shift is selected to be about 90 degrees.

6. The wireless communication device of claim 1, wherein the first variable gain device comprises a bidirectional attenuator.

7. The wireless communication device of claim 6, wherein the second variable gain device comprises a bidirectional attenuator.

8. The wireless communication device of claim 1, further comprising a power combiner to form the summed signal from the first and the second signal paths of at least one of the first gain modulator and the second gain modulator, the power combiner coupling the summed signal to a respective one of the first antenna or the second antenna.

9. The wireless communication device of claim 1, wherein an input signal to the phase shift element is substantially equal to an input signal to the second variable gain device.

10. The wireless communication device of claim 9, further comprising a power splitter coupled to the phase shift element and the second variable gain device of at least one of the first gain module and the second gain module, the power splitter providing the input signal to the phase shift element and the second variable gain device of the gain module.

11. The wireless communication device of claim 1, wherein the phase shift element comprises a hybrid phase splitter or an inductor-capacitor (LC) phase shift network, or combinations thereof.

12. The wireless communication device of claim 1, wherein the phase shift element comprises a transmission line.

13. The wireless communication device of claim 12, wherein the transmission line has a length that is approximately one-quarter of the wavelength of an input signal to the second variable gain device.

14. The wireless communication device of claim 1, wherein the wireless communication device is adapted to dynamically vary the gain of one of the first variable gain device and the second variable gain device.

15. The wireless communication device of claim 14, wherein the wireless communication device is adapted to vary the gain of the first variable gain device independently from the gain of the second variable gain device.

16. An apparatus, comprising:

a first antenna and a second antenna;

a first gain modulator coupled to the first antenna and a second gain modulator coupled to the second antenna, the first and second gain modulators each comprising:

a first signal processing path comprising a first bidirectional variable attenuator, the first signal processing path being adapted to bidirectionally vary an amplitude of a signal passing through the first signal processing path;

a second signal processing path comprising a bidirectional phase shifting element and second bidirectional variable attenuator, the second signal processing path being adapted to bidirectionally shift a phase of a signal passing through the second signal processing path a predetermined fixed amount and bidirectionally vary an amplitude of the signal passing through the second signal processing path, each of the amplitude of the signal passing through the second signal processing path and the amplitude of the signal passing through the first signal processing path being capable of being independently and simultaneously controlled with respect to the amplitude of the signal of the other signal processing path, the first signal processing path of the first gain modulator being summed with the second signal processing path of the second gain modulator to form a summed signal comprising an amplitude that is based on the sum of the amplitudes of the signals in the first and second signal processing paths and comprising a phase that is based on the predetermined fixed phase shift, and the summed signal being coupled to a respective one of the first antenna or the second antenna; and a processor capable of adjusting the amplitude of the signal passing through at least one of the first signal processing path and the second signal processing path of at least one of the first gain modulator and the second gain modulator or combinations thereof, in accordance with a beam forming computation to transmit a signal of a desired characteristic, or receive a signal, or combinations thereof by the first antenna and the second antenna.

17. The apparatus of claim 16, wherein the bidirectional phase shifting element receives an input signal for the second signal processing path.

18. The apparatus of claim 16, wherein the bidirectional phase shifting element provides an output signal of the second signal processing path.

19. A method, comprising:

for each antenna in an array of two or more antennas, modulating signals at the antennas in the array by:

providing a first signal processing path and a second signal processing path, the first signal processing path comprising a bidirectional variable gain device, the second signal processing path comprising a bidirectional phase shifting element and a bidirectional variable gain device;

bidirectionally varying an amplitude a signal passing through at least one of the first or second signal processing paths independently from and simultaneously with the respectively other signal path as determined by the respective bidirectional variable gain device;

bidirectionally shifting a phase of the signal passing through the second signal processing path by a predetermined fixed amount;

summing the signal passing through the first signal processing path and the signal passing through the second signal processing path to form a summed signal comprising an amplitude that is based on the sum of the amplitudes of the signals in the first and second signal processing paths and comprising a phase that is based on the predetermined fixed phase shift and coupling the summed signal to a respective antenna in the array of antennas; and adjusting the amplitude of the signal passing through at least one of the first signal processing path and the second signal processing path, or combinations thereof, in accordance with a beam forming computation to transmit a signal of a desired characteristic, or receive a signal, or combinations thereof by the array of antennas.

20. The method of claim 19, wherein bidirectionally shifting the phase of the signal passing through the second signal processing path comprises bidirectionally shifting the phase of an input signal to the second signal processing path by the predetermined fixed amount.

21. The method of claim 19, wherein bidirectionally shifting the phase of the signal passing through the second signal processing path comprises bidirectionally shifting the phase of a signal providing an output signal of the second signal processing path by the predetermined fixed amount.

22. An article comprising a storage medium having stored thereon instructions, that, if executed by a computing platform, result in:

for each antenna in an array of two or more antennas, modulating signals at the antennas in the array by:

providing a first signal processing path and a second signal processing path, the first signal processing path comprising a bidirectional variable gain device, the second signal processing path comprising a bidirectional phase shifting element and a bidirectional variable gain device;

bidirectionally varying an amplitude a signal passing through at least one of the first or second signal processing paths independently from and simultaneously with the respectively other signal path as determined by the respective bidirectional variable gain device;

bidirectionally shifting a phase of the signal passing through the second signal processing path by a predetermined fixed amount;

summing the signal passing through the first signal processing path and the signal passing through the second signal processing path to form a summed signal comprising an amplitude that is based on the sum of the amplitudes of the signals in the first and second signal processing paths and comprising a phase that is based on the predetermined fixed phase shift and coupling the summed signal to a respective antenna in the array of antennas; and adjusting the amplitude of the signal passing through at least one of the first signal processing path and the second signal processing path, or combinations thereof, in accordance with a beam forming computation to transmit a signal of a desired characteristic, or receive a signal, or combinations thereof by the array of antennas.

23. The article of claim 22, wherein bidirectionally shifting the phase of the signal passing through the second signal processing path comprises bidirectionally shifting the phase of an input signal to the second signal processing path by the predetermined fixed amount.

24. The article of claim 22, wherein bidirectionally shifting the phase of the signal passing through the second signal processing path comprises bidirectionally shifting the phase of a signal providing an output signal of the second signal processing path by the predetermined fixed amount.

* * * * *